(12) United States Patent
Iwata et al.

(10) Patent No.: US 9,609,245 B2
(45) Date of Patent: Mar. 28, 2017

(54) SEMICONDUCTOR APPARATUS HAVING A DECODING FUNCTION, METHOD OF CONTROLLING THE SAME, AND CAMERA

(71) Applicant: CANON KABUSHIKI KAISHA, Tokyo (JP)

(72) Inventors: Koichiro Iwata, Kawasaki (JP); Kazuki Ohshitanai, Kawasaki (JP); Hiroo Akabori, Fujisawa (JP); Takeshi Akiyama, Yokohama (JP); Hiroyuki Morita, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/634,959

(22) Filed: Mar. 2, 2015

(65) Prior Publication Data
US 2015/0264289 A1 Sep. 17, 2015

(30) Foreign Application Priority Data
Mar. 11, 2014 (JP) .................................. 2014-048072

(51) Int. Cl.
*H04N 5/369* (2011.01)
*H04N 5/376* (2011.01)

(52) U.S. Cl.
CPC ........... *H04N 5/3698* (2013.01); *H04N 5/376* (2013.01)

(58) Field of Classification Search
CPC .............................. H04N 5/3698; H04N 5/376
See application file for complete search history.

(56) References Cited

U.S. PATENT DOCUMENTS

| 8,520,457 B2 * | 8/2013 | Inoue ..................... G11C 5/141 365/189.011 |
| 8,749,674 B2 | 6/2014 | Ataki et al. .................. 348/294 |
| 2009/0129157 A1 * | 5/2009 | Honda ................. G11C 11/5628 365/185.03 |
| 2014/0159773 A1 * | 6/2014 | Shin ................... H03K 19/0016 326/80 |

FOREIGN PATENT DOCUMENTS

JP 2009-88769 4/2009

* cited by examiner

*Primary Examiner* — Gevell Selby
(74) *Attorney, Agent, or Firm* — Fitzpatrick, Cella, Harper & Scinto (57) ABSTRACT

A semiconductor apparatus, comprising a decoder arranged in a path between a first power supply line and a second power supply line and configured to receive a signal and decode the signal, a switch portion arranged, in series with the decoder, in the path between the first power supply line and the second power supply line, and a control unit configured to set the switch portion in a conductive state so as to cause the decoder to decode the signal after the signal has changed from one of high level and low level to the other.

17 Claims, 8 Drawing Sheets

SEMICONDUCTOR APPARATUS HAVING A DECODING FUNCTION, METHOD OF CONTROLLING THE SAME, AND CAMERA

BACKGROUND OF THE INVENTION

Field of the Invention

The present invention relates to a semiconductor apparatus, a method of controlling the same, and a camera.

Description of the Related Art

A solid-state imaging apparatus includes a plurality of pixels, a driving unit configured to drive each pixel, and a readout unit configured to read out a signal from each pixel. For example, a decoder is used in part of the driving unit or the readout unit. The decoder, for example, receives a signal of a predetermined number of bits and decodes the signal. After that, a control signal used to read out a signal from each pixel is generated based on the decoded signal.

A through current is generated in the decoder upon receiving a signal. This is because a plurality of transistors that form the decoder and are used for decoding simultaneously are set in a conductive state, and a current path is formed between the power supply node and the ground node. In addition, if many bits of the input signal to the decoder have changed the signal values, the amount of the through current increases. These may be conspicuous problems because in the above-described example of the solid-state imaging apparatus, the number of bits of the input signal to the decoder becomes large along with an increase in the number of pixels.

Note that although a case of a solid-state imaging apparatus has been exemplified here, the same applies to any other semiconductor apparatuses as well.

SUMMARY OF THE INVENTION

It is an object of the present invention to provide a technique advantageous for suppressing a through current in a decoder.

One of the aspects of the present invention provides a semiconductor apparatus, comprising a decoder arranged in a path between a first power supply line and a second power supply line and configured to receive a signal and decode the signal, a switch portion arranged, in series with the decoder, in the path between the first power supply line and the second power supply line, and a control unit configured to set the switch portion in a conductive state so as to cause the decoder to decode the signal after the signal has changed from one of high level and low level to the other.

Further features of the present invention will become apparent from the following description of exemplary embodiments with reference to the attached drawings.

DESCRIPTION OF THE EMBODIMENTS

1. First Embodiment

The first embodiment will be described by exemplifying a solid-state imaging apparatus (to be referred to as a "solid-state imaging apparatus I" hereinafter) included in an imaging system such as a camera.

1-1. Example of Overall Arrangement of Solid-State Imaging Apparatus

Figure 1A:
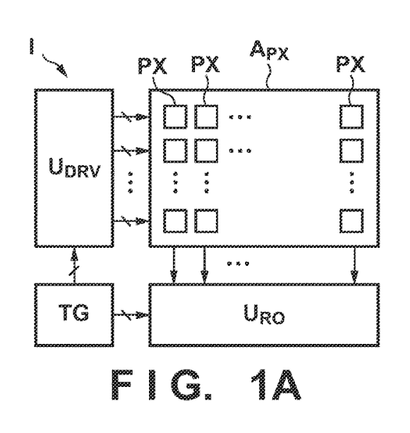
FIGS. 1A to 1D are views for explaining an example of the overall arrangement of a solid-state imaging apparatus.

FIGS. 1A to 1D show an example of the overall arrangement of the solid-state imaging apparatus I. As shown in FIG. 1A, the solid-state imaging apparatus I includes a pixel array $A_{PX}$, a driving unit $U_{DRV}$, a readout unit $U_{RO}$, and a timing generator TG. The pixel array $A_{PX}$ is a pixel region where a plurality of pixels PX are arranged. The driving unit $U_{DRV}$ drives the plurality of pixels PX on a row basis. The readout unit $U_{RO}$ reads out signals from the plurality of pixels PX on a column basis. The timing generator TG supplies corresponding control signals to the units based on an external clock signal or reference signal.

Figure 1B:
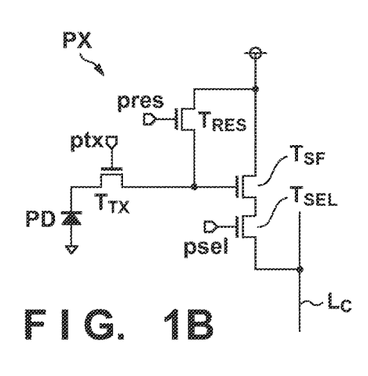

FIG. 1B shows an example of the arrangement of the unit pixel PX. The pixel PX includes, for example, a photoelectric conversion unit PD (for example, photodiode), a transfer transistor $T_{TX}$, a floating diffusion FD, a reset transistor $T_{RES}$, a source-follower transistor $T_{SF}$, and a select transistor $T_{SEL}$. A control signal ptx is given to the gate terminal of the transfer transistor $T_{TX}$. The floating diffusion FD is a semiconductor region where the source region of the transfer transistor $T_{TX}$ is formed, and is in an electrically floating state. When the control signal ptx is activated, charges generated by the photoelectric conversion unit PD are transferred to the floating diffusion FD by the transfer transistor $T_{TX}$.

A control signal pres is given to the gate terminal of the reset transistor $T_{RES}$. When the control signal pres is activated, the reset transistor $T_{RES}$ initializes (resets) the potential of the floating diffusion FD.

The source-follower transistor $T_{SF}$ performs a source-follower operation. The source potential of the source-follower transistor $T_{SF}$ changes in accordance with the charge amount held in the floating diffusion FD. A control signal psel is given to the gate terminal of the select transistor $T_{SEL}$. When the control signal psel is activated, the select transistor $T_{SEL}$ outputs a signal according to the source potential of the source-follower transistor $T_{SF}$ to a column signal line $L_C$ as a pixel signal.

Figure 1C:
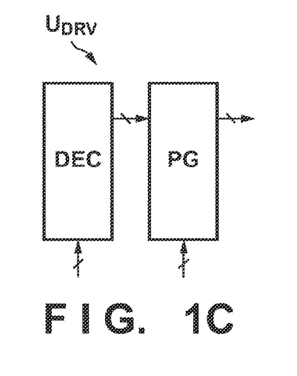

FIG. 1C shows an example of the arrangement of the driving unit $U_{DRV}$. The driving unit $U_{DRV}$ outputs a signal to the pixel array $A_{PX}$ and drives the pixels PX, and also functions as a control unit that controls the pixels PX. The driving unit $U_{DRV}$ includes, for example, a decoder DEC and a pulse generator PG. The decoder DEC decodes, for example, a signal from the timing generator TG. The signal from the timing generator TG includes, for example, the count value of a counter (not shown) in the timing generator TG. The pulse generator PG generates a signal to drive the pixels PX based on the signal from the decoder DEC and the control signal from the timing generator TG.

Figure 1D:
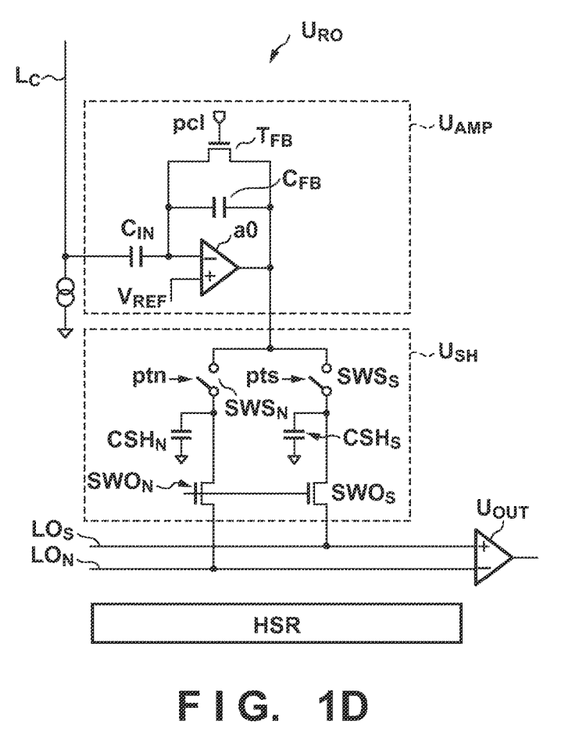

FIG. 1D shows an example of the arrangement of the readout unit $U_{RO}$. The readout unit $U_{RO}$ includes, for example, a signal amplification unit $U_{AMP}$, a signal holding unit $U_{SH}$, a shift register HSR, and an output unit $U_{OUT}$. Note that the signal amplification unit $U_{AMP}$ and the signal holding unit $U_{SH}$ are arranged in correspondence with each column of the pixel array $A_{PX}$. Here, one signal amplification unit $U_{AMP}$ and one signal holding unit $U_{SH}$ corresponding to a given column are illustrated to facilitate the explanation.

The signal amplification unit $U_{AMP}$ includes an input capacitor $C_{IN}$, an operational amplifier a0, a feedback capacitor $C_{FB}$, and a transistor $T_{FB}$. One terminal of the input capacitor $C_{IN}$ is connected to the column signal line $L_C$, and the other terminal of the input capacitor $C_{IN}$ is connected to the inverting input terminal of the operational amplifier a0. A reference voltage $V_{REF}$ is applied to the noninverting input terminal of the operational amplifier a0. The feedback capacitor $C_{FB}$ and the transistor $T_{FB}$ are arranged to be electrically parallel to each other in the feedback path between the output terminal and the inverting input terminal of the operational amplifier a0. The gain of the signal amplification unit $U_{AMP}$ is determined by the ratio of the capacitance value of the input capacitor $C_{IN}$ to the capacitance value of the feedback capacitor $C_{FB}$. The transistor $T_{FB}$ initializes the operational amplifier a0 in response to activation of a control signal pcl. When the operational amplifier a0 is initialized, signals from the pixels PX at the time of resetting are clamped by the input capacitor $C_{IN}$ as noise components.

The signal holding unit $U_{SH}$ includes switches $SWS_N$ and $SWS_S$, sampling capacitors $CSH_N$ and $CSH_S$, and switches $SWO_N$ and $SWO_S$. The switch $SWS_N$ and the sampling capacitor $CSH_N$ form a sample hold circuit configured to sample a signal from the signal amplification unit $U_{AMP}$. More specifically, the switch $SWS_N$ is set in the conductive state in response to activation of a control signal ptn, and the capacitor $CSH_N$ holds a signal. The signal held by the capacitor $CSH_N$ is output to a signal line $LO_N$ when the switch $SWO_N$ is set in the conductive state in response to a control signal from the shift register HSR.

This also applies to the switch $SWS_S$, the sampling capacitor $CSH_S$, and the switch $SWO_S$. That is, the switch $SWS_S$ is set in the conductive state in response to activation of a control signal pts, and the capacitor $CSH_S$ holds a signal. The signal held by the capacitor $CSH_S$ is output to a signal line $LO_S$ when the switch $SWO_S$ is set in the conductive state in response to a control signal from the shift register HSR. Note that the control signal from the shift register HSR may be generated using the decoder and the pulse generator.

The capacitor $CSH_N$ holds a signal level (to be referred to as an "N signal") when the signal amplification unit $U_{AMP}$ is reset, and the capacitor $CSH_S$ holds a signal level (to be referred to as an "S signal") based on the amount of charges generated by photoelectric conversion, as will be described later in detail.

The output unit $U_{OUT}$ is an output amplifier having an inverting input terminal connected to the signal line $LO_N$ and a noninverting input terminal connected to the signal line $LO_S$. The output unit $U_{OUT}$ amplifies and outputs the difference between the N signal held by the capacitor $CSH_N$ and the S signal held by the capacitor $CSH_S$.

1-2. Fluctuation in Substrate Potential in Signal Readout Operation

Figure 2:
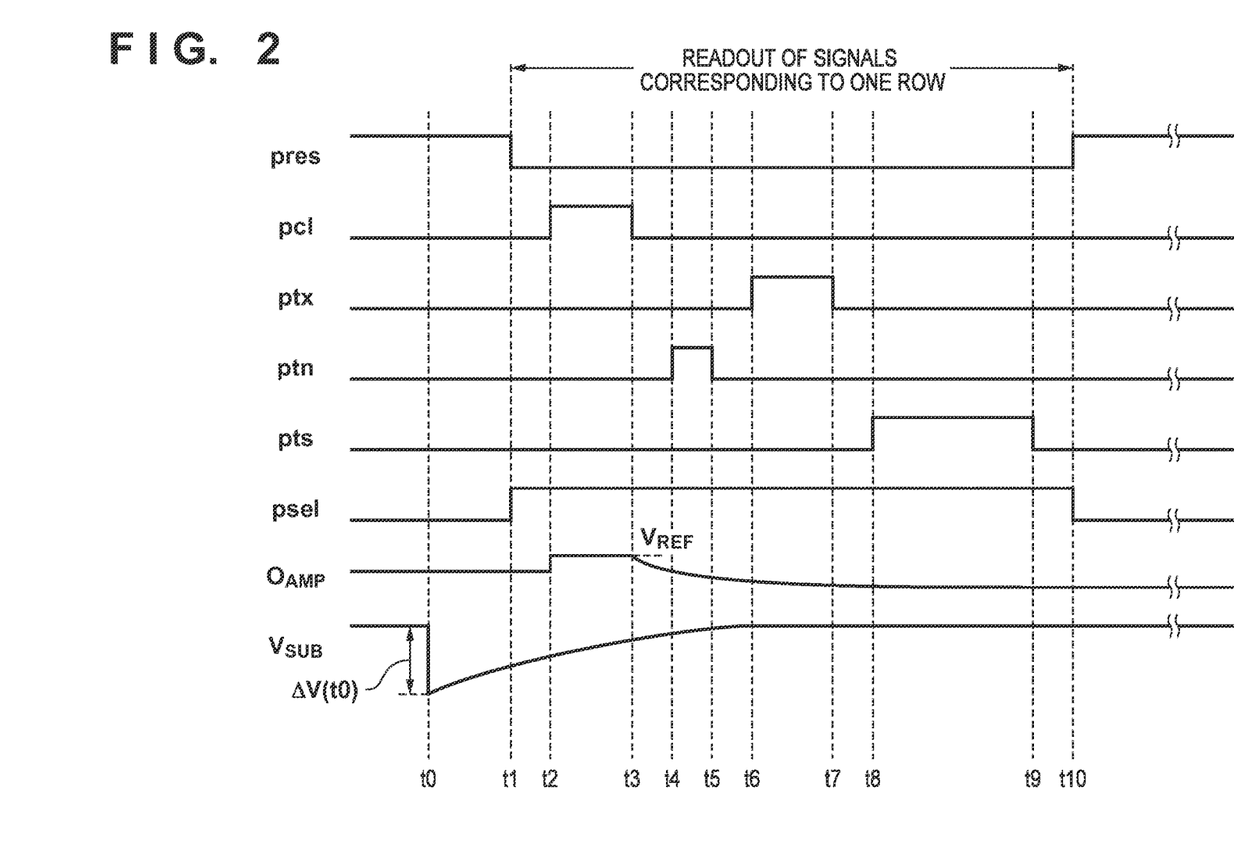
FIG. 2 is a timing chart for explaining a signal readout operation.

A fluctuation in the substrate potential that can occur when reading out a signal from the pixel PX will be described below with reference to FIG. 2. FIG. 2 shows the above-described control signals (signals pres, pcl, ptx, ptn, pts, and psel) and an output $O_{AMP}$ of the signal amplification unit $U_{AMP}$. FIG. 2 also shows the potential (to be referred to as a "substrate potential $V_{SUB}$") of a semiconductor substrate in which the above-described units (pixel array $A_{PX}$, driving unit $U_{DRV}$, readout unit $U_{RO}$, and the like) are formed.

A potential fluctuation in the substrate potential $V_{SUB}$ that can occur when the input signal to the decoder DEC changes will mainly be explained here. To facilitate the explanation, FIG. 2 shows the potential fluctuation in the substrate potential $V_{SUB}$ when the input signal to the decoder DEC changes but not potential fluctuations caused by other operations. Due to the same reason, FIG. 2 does not show fluctuations in the output $O_{AMP}$ of the signal amplification unit $U_{AMP}$ caused by other operations, either. To further facilitate the explanation, assume a case where the light receiving amount of the solid-state imaging apparatus I is 0.

The decoder DEC receives a signal (data) of a predetermined number of bits and, for example, a count value from the counter, as described above. As described above, based on the decoded signal from the decoder DEC and the control signal from the timing generator TG, the pulse generator PG of the driving unit $U_{DRV}$ generates the signal to drive the pixels PX on a row basis.

For example, assume an arrangement that inputs 3-bit data to the decoder DEC. For example, when the decoder DEC receives "000", the pulse generator PG generates a signal to drive the pixels PX of the first row of the pixel array $A_{PX}$. For example, when the decoder DEC receives "001", the pulse generator PG generates a signal to drive the pixels PX of the second row of the pixel array $A_{PX}$. In a similar manner, for example, when the decoder DEC receives "111", the pulse generator PG generates a signal to drive the pixels PX of the eighth row of the pixel array $A_{PX}$.

Here, a timing at which the value of the input signal to the decoder DEC changes, for example, from "000" to "001" or from "011" to "100" is defined as "time t0". At this time, a through current is generated in the decoder DEC, and a potential fluctuation in the substrate potential $V_{SUB}$ can thus occur, as will be described later in detail. In FIG. 2, the fluctuation amount of the substrate potential $V_{SUB}$ is represented by "$\Delta V(t0)$". The substrate potential $V_{SUB}$ then gradually returns to the original potential along with the elapse of time. That is, let $\Delta V(t)$ be the potential fluctuation amount of the substrate potential $V_{SUB}$ at time t. When t increases, $\Delta V(t)$ becomes close to 0.

After that, at times t1 to t10, a signal readout operation of reading out a signal from each corresponding pixel PX in accordance with a change in the input signal to the decoder DEC starts.

At time t1, the signal pres is changed from high level (to be imply referred to as "H" hereinafter) to low level (to be simply referred to as "L" hereinafter), and the signal psel is changed from H to L. When the signal pres is changed to L, resetting of the floating diffusion FD ends. When the signal psel is changed to H, the select transistor $T_{SEL}$ is set in the conductive state. The source-follower transistor $T_{SF}$ thus starts the source-follower operation, and a current in an amount according to the potential of the floating diffusion FD after the resetting is output to the column signal line $L_C$.

At time t2, the signal pcl is changed to H. The transistor $T_{FB}$ is thus set in the conductive state, the operational amplifier a0 is initialized, and the output $O_{AMP}$ becomes $V_{REF}$. In addition, signals from the pixels PX at the time of resetting are clamped by the input capacitor $C_{IN}$ as noise components.

At time t3, the signal pcl is changed to L. The transistor $T_{FB}$ is thus set in the nonconductive state, initialization of the operational amplifier a0 ends, and noise component clamp to the input capacitor $C_{IN}$ is completed. Note that at time t3, the substrate potential $V_{SUB}$ that has caused a potential fluctuation has not yet returned to the steady state (not returned to the original potential), and the output $O_{AMP}$ of the signal amplification unit $U_{AMP}$ changes from $V_{REF}$, as will be described later in detail.

At time t4, the signal ptn is changed to H. The switch $SWS_N$ is thus set in the conductive state, and the N signal, that is, the signal from the signal amplification unit $U_{AMP}$ at the time of resetting of the signal amplification unit $U_{AMP}$ is written in the capacitor $CSH_N$. Note that in an arrangement including no signal amplification unit $U_{AMP}$, the N signal written in the capacitor $CSH_N$ is the signal output from the pixel PX when the pixel PX is reset.

At time t5, the signal ptn is changed to L. The switch $SWS_N$ is thus set in the nonconductive state, and the capacitor $CSH_N$ holds the N signal.

At time t6, the signal ptx is changed to H. The transfer transistor $T_{TX}$ is thus set in the conductive state, and transfer of charges generated in the photoelectric conversion unit PD to the floating diffusion FD ends.

At time t7, the signal ptx is changed to L. The transfer transistor $T_{TX}$ is thus set in the nonconductive state, and the charge transfer ends.

At time t8, the signal pts is changed to H. The switch $SWS_S$ is thus set in the conductive state, and the S signal, that is, the signal from the pixels PX based on the amount of changes generated by photoelectric conversion is written in the capacitor $CSH_S$.

At time t9, the signal pts is changed to L. The switch $SWS_S$ is thus set in the nonconductive state, and the capacitor $CSH_S$ holds the S signal.

At time t10, the signal psel is changed to L. The select transistor $T_{SEL}$ is thus set in the nonconductive state, and the source-follower transistor $T_{SF}$ ends the source-follower operation.

After that, the N signal and the S signal held by the capacitors $CSH_N$ and $CSH_S$ are sequentially output to the signal lines $LO_N$ and $LO_S$ based on the control signal from the shift register HSR on a column basis, and the difference between the N signal and the S signal is sequentially output from the output unit $U_{OUT}$. In the above-described way, signal readout from the pixels PX corresponding to one row is performed.

The case where the light receiving amount of the solid-state imaging apparatus I is 0 is assumed here, as described above. In this case, the signal levels of the N signal and the S signal are equal to each other. However, as described above, from t3, the output $O_{AMP}$ of the signal amplification unit $U_{AMP}$ changes due to the potential fluctuation in the substrate potential $V_{SUB}$, and the signal levels of the N signal and the S signal are different from each other. Let "$\Delta V_{SN}$" be the signal level difference between the N signal and the S signal.

The signal level difference $\Delta V_{SN}$ is caused by the through current generated in the decoder DEC, as will be described later in detail. Here, let $V_{t5-t9}$ be the absolute value of the difference between the substrate potential $V_{SUB}$ at time t5 when holding the N signal is completed and the substrate potential $V_{SUB}$ at time t9 when holding the S signal is completed (the change amount of the substrate potential $V_{SUB}$ from time t5 to t9). In this case, the signal level difference $\Delta V_{SN}$ between the N signal and the S signal is given by $$\Delta V_{SN} = \Delta V_{t5-t9} \times A \times G_{SF} \times G_{AMP} \qquad (1)$$

A: coefficient $G_{SF}$: gain of source-follower transistor $T_{SF}$ $G_{AMP}$: gain of signal amplification unit $U_{AMP}$ Note that the coefficient A is the potential fluctuation ratio of the floating diffusion FD by the substrate potential $V_{SUB}$, and changes its value depending on the pixel position because it depends on a parasitic resistance, parasitic capacitance, and the like.

1-3. Reference Example

Figure 3A:
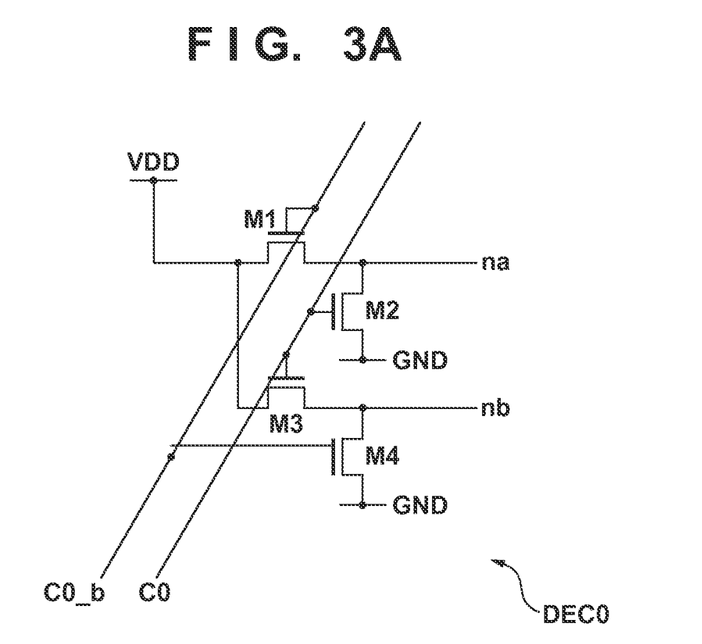
FIGS. 3A and 3B are views for explaining an example of the arrangement of a decoder and an example of a control method.

FIG. 3A shows an example of the arrangement of a decoder DEC0 as a reference example. Here, the decoder DEC0 corresponding to one bit is illustrated to facilitate the explanation. However, a plurality of decoders DEC0 corresponding to the number of bits are used. The decoder DEC0 includes, for example, NMOS transistors M1 to M4. The transistors M1 and M2 are arranged in series so as to form a current path between a VDD node (power supply line to apply a power supply voltage) and a GND node (power supply line for ground). Similarly, the transistors M3 and M4 are arranged in series so as to form another current path between the VDD node and the GND node.

The decoder DEC0 also includes signal lines C0 and C0_b. The gates of the transistors M2 and M3 are connected to the signal line C0, and the gates of the transistors M1 and M4 are connected to the signal line C0_b. A signal that propagates through the signal line C0 and a signal that propagates through the signal line C0_b have signal levels opposite to each other. For example, one signal is generated from the other signal via an inverter or the like.

When the signal of the signal line C0 is L, the transistors M1 and M4 are set in the conductive state, and the transistors M2 and M3 are set in the nonconductive state. As a result, the output of a node na is H, and the output of a node nb is L. When the signal of the signal line C0 is H, the transistors M1 and M4 are set in the nonconductive state, and the transistors M2 and M3 are set in the conductive state. As a result, the output of the node na is L, and the output of the node nb is H.

The signal of the signal line C0 and the signal of the signal line C0_b change their signal levels at different timings, that is, they can have a time difference in signal propagation. For example, in the above-described arrangement that generates one signal from the other signal via an inverter or the like, the time difference occurs due to a signal delay by the inverter. The time difference is also caused by, for example, the wiring resistance and the wiring capacitance of the signal lines C0 and C0_b.

Figure 3B:
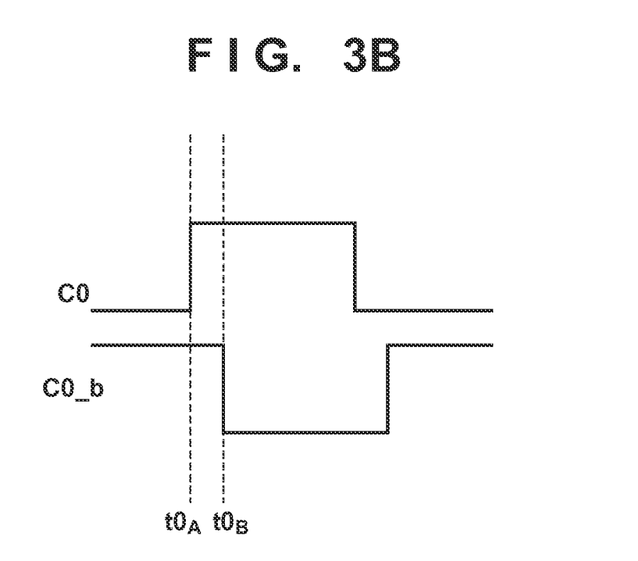

FIG. 3B is a timing chart for explaining the case where the signals of the signal lines C0 and C0_b change the signal levels at different timings. Assume an arrangement that generates the signal of the signal line C0_b from the signal of the signal line C0 via an inverter.

In FIG. 3B, the time at which the signal of the signal line C0 changes from L to H is represented by "$t0_A$", and the time at which the signal of the signal line C0_b changes from H to L due to the above change is represented by "$t0_B$". The signal level change timing is later in the signal of the signal line C0_b than in the signal of the signal line C0 due to a signal delay by the inverter. From time $t0_A$ to $t0_B$, all the transistors M1 to M4 are in the conductive state, current paths are formed between the VDD node and the GND node, and a through current is generated. This can cause the above-described potential fluctuation in the substrate potential $V_{SUB}$.

Figure 4:
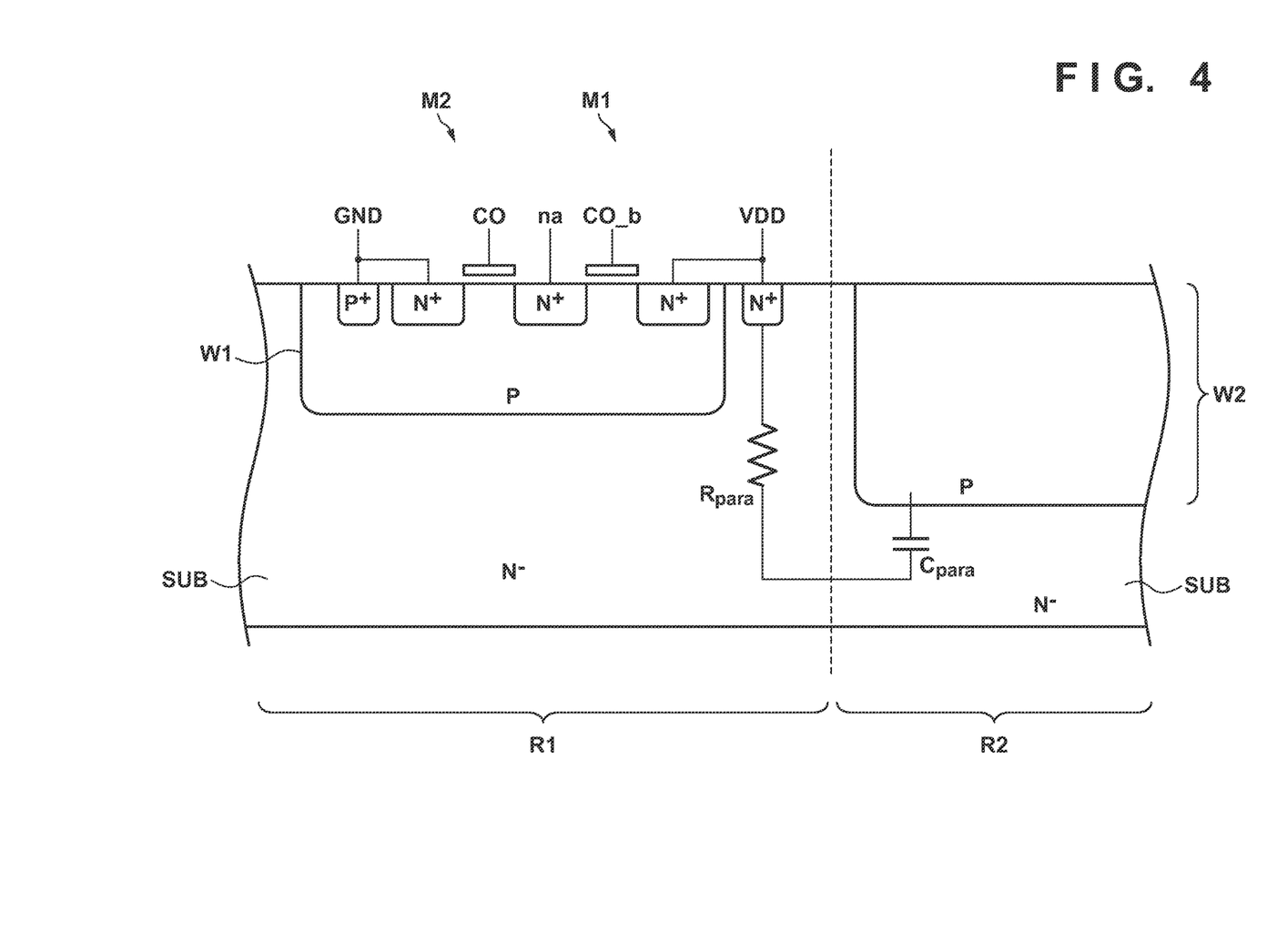
FIG. 4 is a sectional view for explaining an example of the sectional structure of the decoder.

FIG. 4 shows the sectional structure of the portion of the transistors M1 and M2 in the decoder DEC0. A region R1 is a region where the decoder is formed. A region R2 is a region where the pixel PX (not shown) is formed. A p-type well W1 is formed in the region R1 of an n-type semiconductor substrate SUB. A p-type well W2 is formed in the region R2 of the substrate SUB. Corresponding elements are formed in the wells W1 and W2. For example, the portions of the transistors M1 and M2 are formed in the well W1.

Referring to FIG. 4, a parasitic resistance component Rpara and a parasitic capacitance component Cpara exist between the well W2 and a contact plug configured to apply a power supply potential to the substrate SUB. The above-described fluctuation in the substrate potential $V_{SUB}$ caused by the through current in the decoder DEC0 causes fluctuation of the potential of the well W1, that is, the reference potential of the floating diffusion FD via the components Rpara and Cpara. As a result, the output $O_{AMP}$ of the signal amplification unit $U_{AMP}$ changes.

Note that the potential of the well W1 returns to the original potential (0 [V]) along with the elapse of time in accordance with time constant τ=Rpara×Cpara.

Let ΔV(t5) be the fluctuation amount of the substrate potential $V_{SUB}$ at time t5, and ΔV(t9) be the fluctuation amount of the substrate potential $V_{SUB}$ at time t9 (see FIG. 2). At this time, when τ=Rpara×Cpara, $$\Delta V(t5) = \Delta V(t0) \times \exp\{-(t5-t0)/\tau\},$$

$$\Delta V(t9) = \Delta V(t0) \times \exp\{-(t9-t0)/\tau\} \quad (2)$$

Hence, using equation (2), equation (1) described above can be expressed as $$\Delta V_{SN} = \{\Delta V(t5) - \Delta V(t9)\} \times A \times G_{SF} \times G_{AMP} \quad (3)$$
$$= \Delta V(t0) \times [\exp\{-(t5-t0)/\tau\} - \exp\{-(t9-t0)/\tau\}] \times A \times G_{SFu} \times G_{AMP}$$

The current amount of the through current in the above-described decoder DEC0 changes depending on the signal value of the input signal to the decoder DEC0. For example, in a first case where the input signal changes from "000" to "001", only one bit at the first place out of the three bits changes the signal value. In a second case where the input signal changes from "001" to "010", two bits at the first and second places out of the three bits change the signal values. For this reason, a through current twice as much as in the above-described first case can be generated. For example, in a third case where the input signal changes from "011" to "100", all bits at the first to third places out of the three bits change the signal values. For this reason, a through current three times as much as in the above-described first case can be generated.

Since the amount of the above-described through current changes depending on the signal value of the input signal to the decoder DEC0, the signal level difference $\Delta V_{SN}$ changes in every row (in this example, every $2^k$th row, where k is an integer: k≥1). This may degrade image quality so that, for example, the image obtained from the solid-state imaging apparatus includes striped noise.

1-4. First Example

Figure 5A:
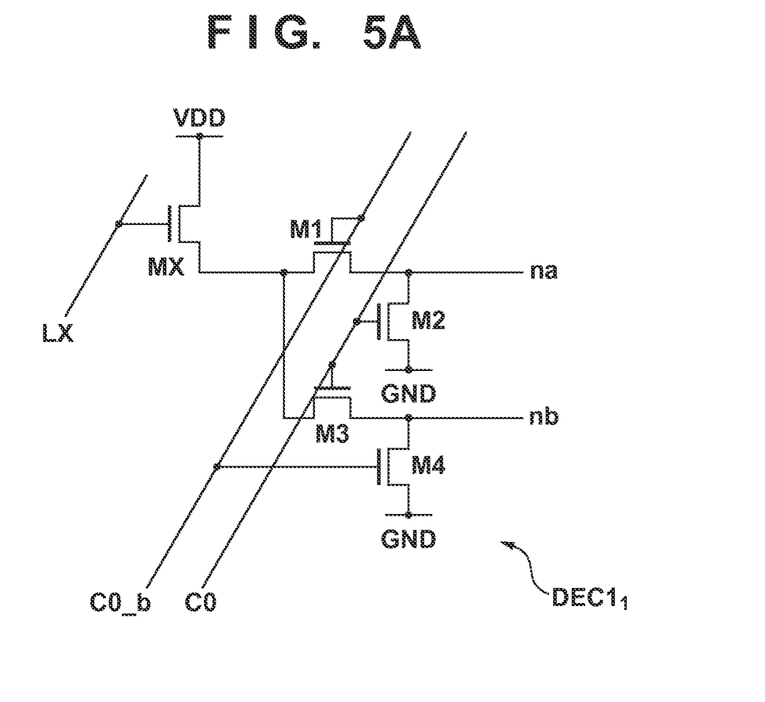
FIGS. 5A and 5B are views for explaining an example of the arrangement of a decoder and an example of a control method.

FIG. 5A shows an example of the arrangement of a decoder $DEC1_1$ corresponding to one bit as the first example of this embodiment. The decoder $DEC1_1$ is different from the decoder DEC0 mainly in further including a transistor MX arranged between the VDD node and the transistors M1 and M4 so as to form a current path. The gate of the transistor MX is connected to a signal line LX, and the transistor MX is set in the conductive state in response to activation of the signal of the signal line LX.

Figure 5B:
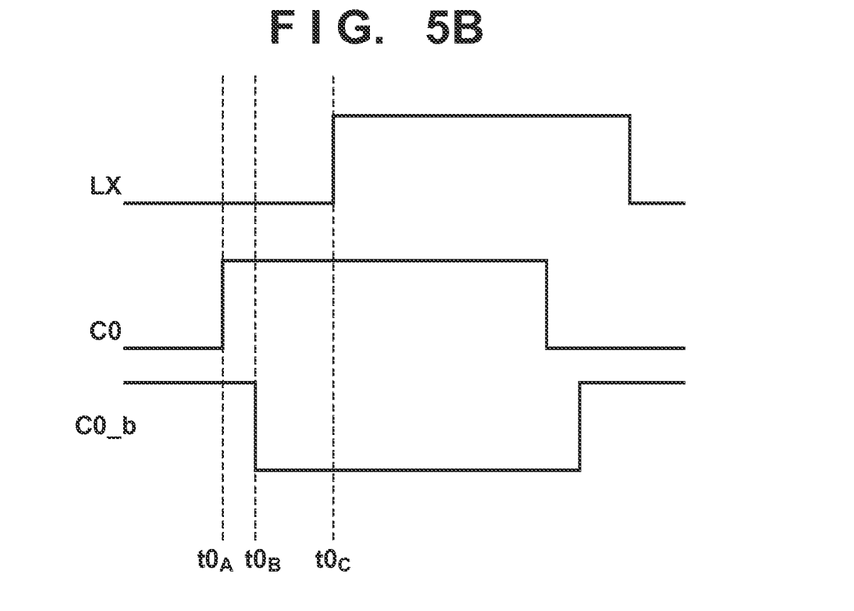

FIG. 5B is a timing chart of the signals of the signal lines LX, C0, and C0_b to drive the decoder $DEC1_1$. First, as in FIG. 3B, the signal of the signal line C0 changes from L to H at the time $t0_A$, and the signal of the signal line C0_b changes from H to L at the time $t0_B$. At time $t0_C$ after that, the signal of the signal line LX is changed from L to H.

According to the control method of the decoder $DEC1_1$, since no current path is formed between the VDD node and the GND node from time $t0_A$ to $t0_B$, no through current is generated. Hence, according to this control method, the potential fluctuation in the above-described substrate potential $V_{SUB}$ is prevented. At time $t0_C$, the transistor MX is set in the conductive state, and signal levels based on the signals of the signal lines C0 and C0_b are output from the node na and nb, respectively.

The decoder $DEC1_1$ may be configured to reset its output node and other nodes by intentionally prolonging the period from time $t0_A$ to $t0_B$. The period from time $t0_A$ to $t0_B$ can be adjusted by changing the design value of the inverter connected to the signal line C0_b or by inserting a predetermined delay circuit into the signal line C0_b.

Note that in this arrangement, the signal level change timing is later in the signal of the signal line C0_b than in the signal of the signal line C0. For this reason, when the signal of the signal line C0 changes from H to L, and the signal of the signal line C0_b changes from L to H after time $t0_C$, the through current is probably not generated. Hence, in this arrangement, after the signal of the signal line C0_b changes from L to H, the signal of the signal line LX is changed from L to H.

According to the arrangement and control method of the decoder $DEC1_1$, no through current is generated in the decoder $DEC1_1$ when the input signal to the decoder $DEC1_1$ changes. It is therefore possible to prevent a fluctuation in the substrate potential $V_{SUB}$. Hence, for example, the above-described striped noise that can be formed in the image obtained from the solid-state imaging apparatus is prevented, and the quality of the image improves.

In addition, according to this arrangement, since the fluctuation in the substrate potential $V_{SUB}$ can be prevented, the region R1 where the decoder is formed and the region R2 where the pixel PX is formed need not electrically be separated in the substrate SUB. Hence, the chip area can be reduced by omitting the separation region formed to electrically separate the regions R1 and R2. In addition, a common power supply voltage can be used for the elements in the regions R1 and R2.

1-5. Second Example

Figure 6:
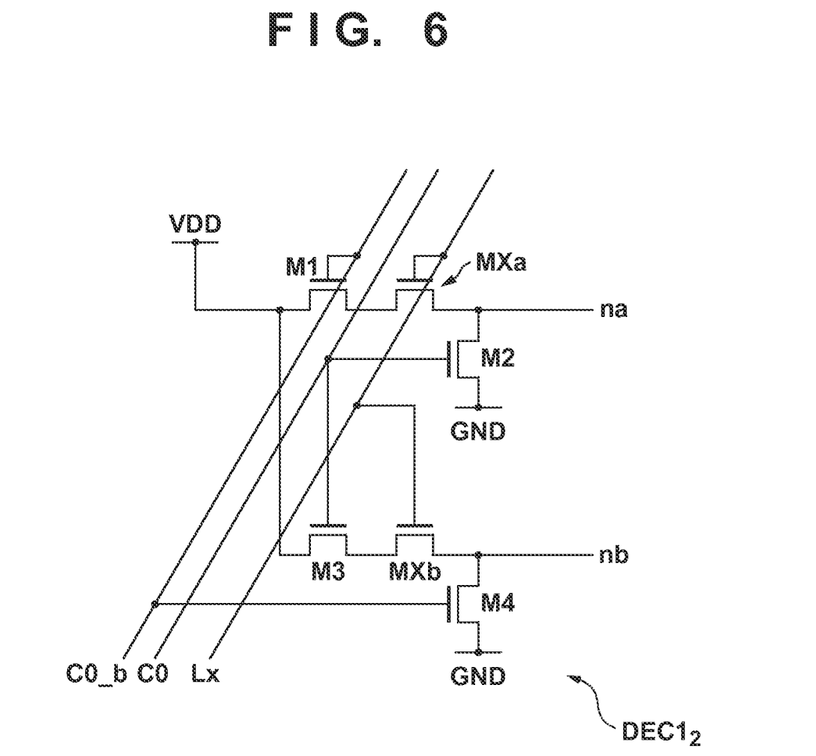
FIG. 6 is a circuit diagram for explaining an example of the arrangement of a decoder.

FIG. 6 shows an example of the arrangement of a decoder $DEC1_2$ corresponding to one bit as the second example of this embodiment. The decoder $DEC1_2$ is different from the above-described decoder $DEC1_1$ mainly in that in place of the transistor MX, a transistor MXa is arranged between the transistors M1 and M2, and a transistor MXb is arranged between the transistors M3 and M4. According to this arrangement as well, the same effects as in the first example can be obtained.

As described above, according to this embodiment, the decoder DEC1 (DEC1$_1$ and DEC1$_2$) is provided with a switch portion (transistor MX or the like) configured to cut off the current path that can be formed when the signal value of the input signal to the decoder DEC1 changes. The input signal to the decoder DEC1 is decoded while preventing a through current by controlling the switch portion.

Note that in the two examples described above, the transistor MX forms part of the decoder DEC1. However, this arrangement is not limited to these examples and can appropriately be modified without departing from the scope of the present invention. For example, out of the transistors M1 to M4 and the transistor MX in the examples, the transistor MX that functions as the switch portion may be included in another unit. Alternatively, for example, another unit may be arranged between the transistor MX and the transistors M1 to M4 as needed.

Here, the decoder DEC1 has been exemplified as the arrangement example of the decoder. However, the arrangement of the decoder is not limited to this. The decoder is formed from predetermined elements arranged in the path between the VDD node and the GND node. When the input signal to the decoder changes, a current path is formed between the VDD node and the GND node, and a through current is generated. It is therefore possible to apply the present invention not only to the decoder DEC1 but also to decoders of other arrangements.

2. Second Embodiment

The present invention is applicable to a variety of arrangements of a decoder. For example, when a decoder includes a plurality of circuit units to do decoding, the above-described switch portion can be applied to each circuit unit. The second embodiment will be described below as one example of the variety of arrangements of the decoder with reference to FIGS. 7A to 8.

Figure 7A:
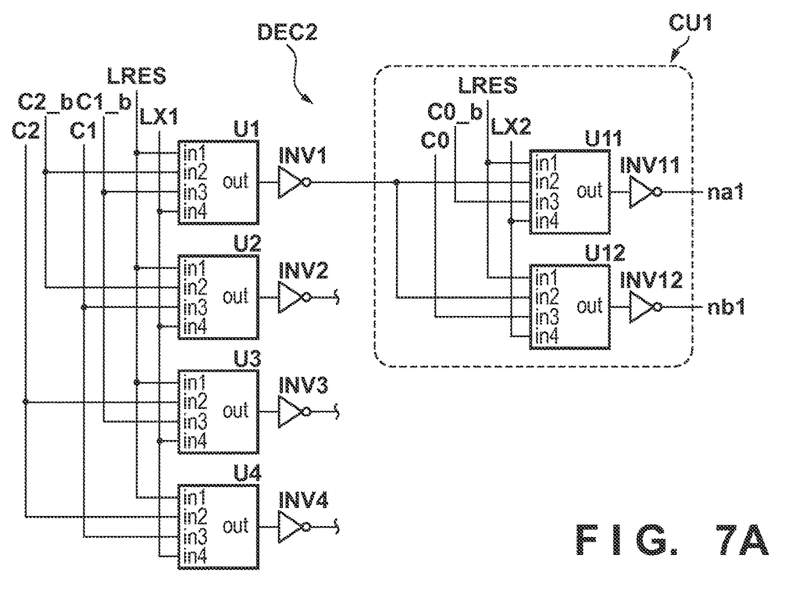
FIGS. 7A and 7B are circuit diagrams for explaining an example of the arrangement of a decoder.
Figure 7B:
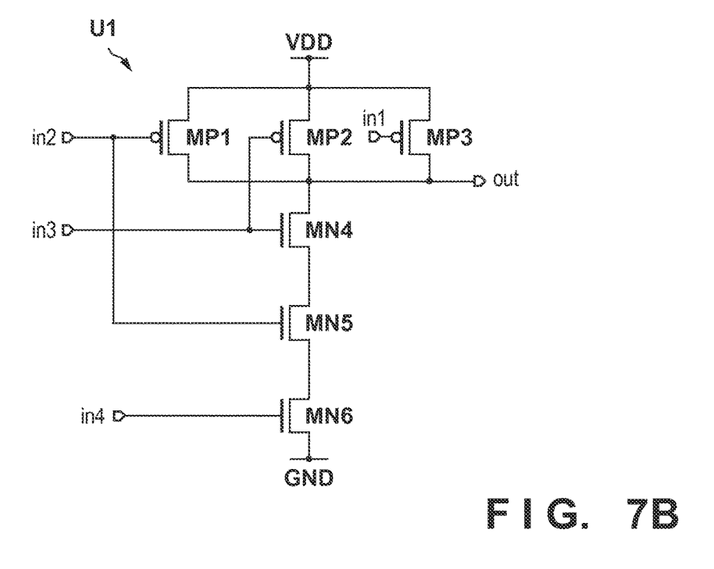

FIG. 7A shows an example of the arrangement of a decoder DEC2 according to this embodiment. The decoder DEC2 includes a unit U1 and the like and an inverter INV1 and the like. Signal lines C0 to C2 propagate the input signal (3 bits) to the decoder DEC2 and correspond to the signals at the first to third places, respectively. Signal lines C0_b to C2_b propagate signals of signal level opposite to that of the signals of the signal lines C0 to C2. Note that although an example of the arrangement of the decoder DEC2 corresponding to 3 bits is illustrated here to facilitate the explanation, the arrangement of the decoder is changed in accordance with the number of bits.

The unit U1 and the like employ arrangements that are equal to each other. Each unit includes four input terminals in1 to in4 and one output terminal out.

FIG. 7B shows an example of the arrangement of the unit U1. The unit U1 includes PMOS transistors MP1 to MP3 and NMOS transistors MN4 to MN6. The transistors MP1 to MP3 are arranged to be parallel to each other so as to form current paths between a VDD node and the output terminal out. The transistors MN4 to MN6 are sequentially arranged in series so as to form a current path between the output terminal out and a GND node. The input terminal in1 is connected to the gate of the transistor MP3. The input terminal in2 is connected to the gates of the transistors MP1 and MN5. The input terminal in3 is connected to the gates of the transistors MP2 and MN4. The input terminal in4 is connected to the gate of the transistor MN6. Remaining unit U2 and the like employ the same arrangement.

As shown in FIG. 7A, the input terminal in1 of the unit U1 is connected to a signal line LRES that propagates a reset signal. The input terminal in2 of the unit U1 is connected to the signal line C2_b. The input terminal in3 of the unit U1 is connected to the signal line C1_b. The input terminal in4 of the unit U1 is connected to the signal line LX1.

Similarly, the input terminal in1 of the unit U2 is connected to the signal line LRES. The input terminal in2 of the unit U2 is connected to the signal line C2_b. The input terminal in3 of the unit U2 is connected to the signal line C1. The input terminal in4 of the unit U2 is connected to the signal line LX1. The input terminal in1 of a unit U3 is connected to the signal line LRES. The input terminal in2 of the unit U3 is connected to the signal line C2. The input terminal in3 of the unit U3 is connected to the signal line C1_b. The input terminal in4 of the unit U3 is connected to the signal line LX1. The input terminal in1 of a unit U4 is connected to the signal line LRES. The input terminal in2 of the unit U4 is connected to the signal line C2. The input terminal in3 of the unit U4 is connected to the signal line C1. The input terminal in4 of the unit U4 is connected to the signal line LX1.

The inverter INV1 is arranged in correspondence with the unit U1. The input terminal of the inverter INV1 is connected to the output terminal out of the unit U1.

Units U11 and U12 are arranged in correspondence with the unit U1 and the inverter INV1. The input terminal in1 of the unit U11 is connected to the signal line LRES. The input terminal in2 of the unit U11 is connected to the output terminal of the inverter INV1. The input terminal in3 of the unit U11 is connected to the signal line C0_b. The input terminal in4 of the unit U11 is connected to a signal line LX2. The input terminal in1 of the unit U12 is connected to the signal line LRES. The input terminal in2 of the unit U12 is connected to the output terminal of the inverter INV1. The input terminal in3 of the unit U12 is connected to the signal line C0. The input terminal in4 of the unit U12 is connected to the signal line LX2.

An inverter INV11 is arranged in correspondence with the unit U11. An inverter INV12 is arranged in correspondence with the unit U12.

With the above-described arrangement, signal levels based on the signals of the signal line C0 and the like are output from a node na1 that is the output node of the inverter INV11 and a node nb1 that is the output node of the inverter INV12, respectively.

A portion including the units U11 and U12 and the inverters INV11 and INV12, indicated by the broken line in FIG. 7A, is defined as a "unit cell CU1". Although not illustrated here to facilitate the explanation, unit cells CU2 to CU4 are arranged in correspondence with the units U2 to U4 and inverters INV2 to INV4, respectively.

Figure 8:
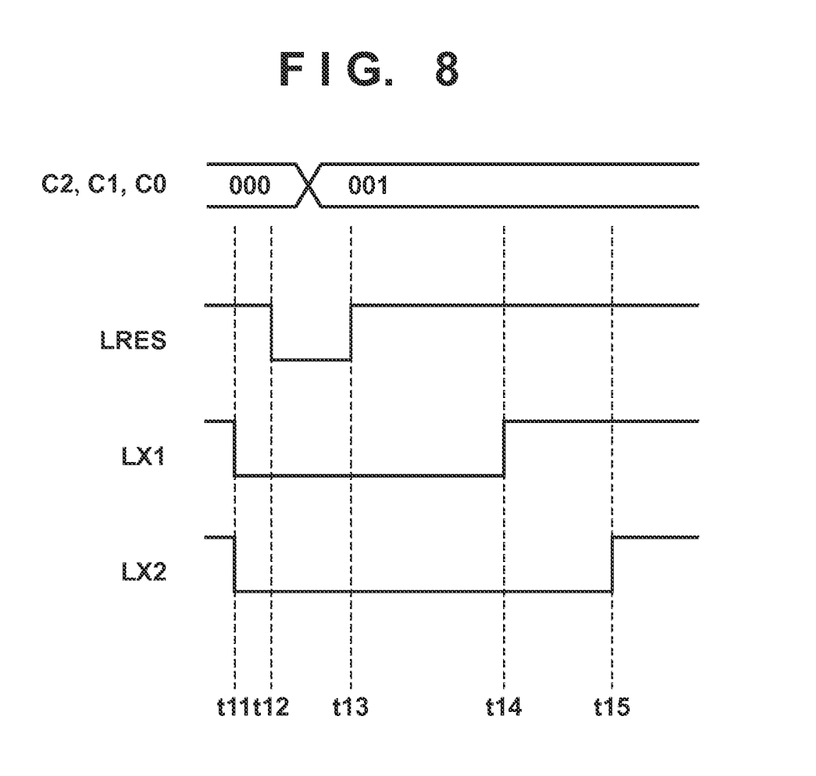
FIG. 8 is a timing chart for explaining an example of a method of controlling a decoder.

FIG. 8 is a timing chart of the signals of the signal lines C0 to C2, LRES, LX1, and LX2 to drive the decoder DEC2. Out of times t11 to t15 in FIG. 8, times before time t12 are times before the values of the signals of the signal lines C0 to C2 change from "000" to "001", and times after time t13 are times after the change.

At time t11, the signals of the signal lines LX1 and LX2 are changed from H to L. The transistor MN6 is set in the conductive state in all of the unit U1 and the like, and the current path between the VDD node and the GND node is cut off in the unit U1 and the like.

At time t12, the signal of the signal line LRES is changed from H to L. The transistor MP3 is set in the conductive state, and the potential of the output terminal out is initialized to H in all the unit U1 and the like. That is, the potential of each node in the decoder DEC2 is initialized.

After that, the values of the signals of the signal lines C0 to C2 change from "000" to "001". At this time, since the current path between the VDD node and the GND node is cut off in the unit U1 and the like, no through current is generated in the unit U1 and the like.

At time t13, the signal of the signal line LRES is changed from L to H. The transistor MP3 is set in the nonconductive state, and the initialization ends in all the unit U1 and the like.

At time t14, the signal of the signal line LX1 is changed from L to H. The transistors MN6 of the units U1 to U4 are set in the conductive state, and signal levels based on the signals of the signal lines C1 and C2 are output from the output terminals out of the units U1 to U4, respectively. That is, at time t14, the transistors MN6 of the units U1 to U4 are set in the conductive state to activate the units U1 to U4, thereby determining the signal levels in the units U1 to U4.

At time t15, the signal of the signal line LX2 is changed from L to H. In, for example, the unit cell CU1, the transistors MN6 of the units U11 and U12 are set in the conductive state. Signal levels (more specifically, signal levels based on the signal input from the unit U1 via the inverter INV1 and the signal of the signal line C0) based on the signals of the signal lines C0 to C2 are output from the units U11 and U12 to the inverters INV11 and INV12. This also applies to the remaining unit cells CU2 to CU4. That is, at time t15, the unit cells CU1 to CU4 are activated, thereby determining the signal levels in the unit cells CU1 to CU4, and determining the outputs from the node na1 and the like. In the above-described way, the decoded signal is output from the node na1 and the like.

According to the arrangement and control method of the decoder DEC2, no through current is generated in the decoder DEC2 when the input signal to the decoder DEC2 changes. It is therefore possible to prevent a fluctuation in the substrate potential $V_{SUB}$. As described above, the present invention is applicable to a variety of arrangements of a decoder. According to this arrangement as well, the same effects as in the first embodiment can be obtained.

3. Others

In this specification, two embodiments have been described. However, the present invention is not limited to these. The embodiments may appropriately partially be modified or combined in accordance with the purpose or the like.

In the above embodiments, a solid-state imaging apparatus including an imaging system represented by a camera has been described. The concept of the imaging system includes not only an apparatuses mainly aiming at shooting but also apparatuses (for example, a personal computer and a portable terminal) having an auxiliary shooting function. The imaging system can include a solid-state imaging apparatus exemplified in the above embodiments, and a processing unit that processes a signal output from the solid-state imaging apparatus. The processing unit can include, for example, an A/D converter, and a processor that processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-048072, filed Mar. 11, 2014, which is hereby incorporated by reference herein in its entirety.

What is claimed is:

1. A semiconductor apparatus comprising:
   a decoder arranged in a path between a first power supply line and a second power supply line and configured to receive a signal and decode the signal;
   a switch portion arranged, in series with said decoder, in the path between the first power supply line and the second power supply line; and
   a control unit configured to set said switch portion in a conductive state so as to cause said decoder to decode the signal after the signal has changed from one of high level and low level to the other,
   wherein said decoder comprises at least two transistors arranged in series in the path between the first power supply line and the second power supply line.

2. The apparatus according to claim 1, wherein said decoder comprises:
   a first transistor and a second transistor arranged in series in a first path between the first power supply line and the second power supply line; and
   a third transistor and a fourth transistor arranged in series in a second path between the first power supply line and the second power supply line,
   a first signal and a second signal whose signal level is opposite to the signal level of the first signal are input to said decoder,
   said first transistor and said fourth transistor operate upon receiving the first signal, and
   said second transistor and said third transistor operate upon receiving the second signal.

3. The apparatus according to claim 2, wherein said switch portion is arranged in each of a path between said first transistor and said second transistor and a path between said third transistor and said fourth transistor.

4. The apparatus according to claim 1, wherein said decoder comprises an initialization unit configured to initialize a potential of an output node of said decoder.

5. The apparatus according to claim 4, wherein said initialization unit initializes the potential of the output node during a period when said switch portion is in a nonconductive state.

6. The apparatus according to claim 1, wherein said control unit sets said switch portion in a nonconductive state after the signal to said decoder has changed from the other of the high level and the low level to the one.

7. The apparatus according to claim 1, wherein said semiconductor apparatus comprises a solid-state imaging apparatus,
   said solid-state imaging apparatus comprises a plurality of pixels, a driving unit configured to drive each pixel, and a readout unit configured to read out a signal from each pixel, and
   at least one of said driving unit and said readout unit includes said decoder.

8. The apparatus according to claim 7, wherein a common power supply voltage is supplied to said plurality of pixels and said decoder.

9. A camera comprising:
   a solid-state imaging apparatus that is a semiconductor apparatus of claim 7; and
   a processing unit configured to process a signal output from said solid-state imaging apparatus.

10. A semiconductor apparatus comprising:

a decoder arranged in a path between a first power supply line and a second power supply line and configured to receive a signal and decode the signal, said decoder including a switch portion and decoding the signal received when said switch portion is in a conductive state; and a control unit configured to set said switch portion in the conductive state so as to cause said decoder to decode the signal after the signal has changed from one of high level and low level to the other, wherein said decoder comprises:

a first transistor and a second transistor arranged in series in a first path between the first power supply line and the second power supply line; and a third transistor and a fourth transistor arranged in series in a second path between the first power supply line and the second power supply line, a first signal and a second signal whose signal level is opposite to the signal level of the first signal are input to said decoder, said first transistor and said fourth transistor operate upon receiving the first signal, and said second transistor and said third transistor operate upon receiving the second signal.

11. The apparatus according to claim 10, wherein said switch portion is arranged in each of a path between said first transistor and said second transistor and a path between said third transistor and said fourth transistor.

12. The apparatus according to claim 10, wherein said semiconductor apparatus comprises a solid-state imaging apparatus, said solid-state imaging apparatus comprises a plurality of pixels, a driving unit configured to drive each pixel, and a readout unit configured to read out a signal from each pixel, and at least one of said driving unit and said readout unit includes said decoder.

13. A camera comprising:

a solid-state imaging apparatus that is a semiconductor apparatus of claim 12; and a processing unit configured to process a signal output from said solid-state imaging apparatus.

14. A semiconductor apparatus comprising:

a first transistor and a second transistor arranged in series in a first path between a first power supply line and a second power supply line; and a third transistor and a fourth transistor arranged in series in a second path between the first power supply line and the second power supply line, wherein when said first transistor and said fourth transistor receive a first signal, and said second transistor and said third transistor receive a second signal whose signal level is opposite to the signal level of the first signal, said first transistor, said second transistor, said third transistor, and said fourth transistor output signals corresponding to the first signal and the second signal, said semiconductor apparatus further comprises:

a switch portion arranged in each of the first path and the second path; and a control unit configured to set said switch portion in a conductive state so as to cause said first transistor, said second transistor, said third transistor, and said fourth transistor to output the signals corresponding to the first signal and the second signal after each of the first signal and the second signal has changed from one of high level and low level to the other.

15. The apparatus according to claim 14, wherein said first transistor, said second transistor, said third transistor, and said fourth transistor form a decoder and decode the first signal and the second signal.

16. The apparatus according to claim 15, wherein said semiconductor apparatus comprises a solid-state imaging apparatus, said solid-state imaging apparatus comprises a plurality of pixels, a driving unit configured to drive each pixel, and a readout unit configured to read out a signal from each pixel, and at least one of said driving unit and said readout unit includes said first transistor, said second transistor, said third transistor, and said fourth transistor that form said decoder.

17. A camera comprising:

a solid-state imaging apparatus that is a semiconductor apparatus of claim 16; and a processing unit configured to process a signal output from said solid-state imaging apparatus.

* * * * *